United States Patent
Backman et al.

(10) Patent No.: US 8,839,365 B2
(45) Date of Patent: Sep. 16, 2014

(54) DYNAMIC APPLICATION CHARGING IDENTIFICATION

(75) Inventors: Jan Backman, Karna (SE); Kim Martinsen, Stenungsund (SE)

(73) Assignee: Telefonaktiebolaget L M Ericsson (Publ), Stockholm (SE)

( * ) Notice: Subject to any disclaimer, the term of this patent is extended or adjusted under 35 U.S.C. 154(b) by 0 days.

(21) Appl. No.: 13/516,852

(22) PCT Filed: Dec. 16, 2009

(86) PCT No.: PCT/EP2009/067279
§ 371 (c)(1), (2), (4) Date: Jun. 18, 2012

(87) PCT Pub. No.: WO2011/072733
PCT Pub. Date: Jun. 23, 2011

(65) Prior Publication Data
US 2012/0260312 A1    Oct. 11, 2012

(51) Int. Cl.
| G06F 17/00 | (2006.01) |
| H04M 15/26 | (2006.01) |
| H04W 12/06 | (2009.01) |
| H04L 29/06 | (2006.01) |
| H04M 15/00 | (2006.01) |

(52) U.S. Cl.
CPC .............. *H04M 15/00* (2013.01); *H04M 15/26* (2013.01); *H04W 12/06* (2013.01); *H04L 63/12* (2013.01)
USPC .............................................. 726/3; 713/156

(58) Field of Classification Search
CPC ....................................................... H04L 9/08
USPC ............................................... 726/3; 713/156
See application file for complete search history.

(56) References Cited

U.S. PATENT DOCUMENTS

| 6,854,063 | B1 | 2/2005 | Qu et al. |
| 8,346,753 | B2 * | 1/2013 | Hayes ........................... 707/709 |
| 2004/0236593 | A1 * | 11/2004 | Swanson et al. .................. 705/1 |
| 2005/0080905 | A1 * | 4/2005 | Dolinar et al. ................ 709/227 |
| 2007/0094723 | A1 * | 4/2007 | Short et al. ....................... 726/14 |
| 2008/0273704 | A1 * | 11/2008 | Norrman et al. .............. 380/278 |

(Continued)

FOREIGN PATENT DOCUMENTS

| EP | 1054529 A2 * | 11/2000 |
| WO | 2004100466 A1 | 11/2004 |

OTHER PUBLICATIONS

3GPP TR 23.803, 3rd Generation Partnership Project; Technical Specification Group Services and System Aspects; Evolution of Policy Control and Charging (Release 7); Mar. 24, 2005, XP-002389323.

*Primary Examiner* — Teshome Hailu
*Assistant Examiner* — Abiy Getachew
(74) *Attorney, Agent, or Firm* — Rothwell, Figg, Ernst & Manbeck, P.C.

(57) ABSTRACT

The present invention relates to a solution for handling charging and statistics of use of applications in a wireless communication network (100) and in particular identifying type of service provided in a safe manner. This is provided by providing an authenticated application identifier in data packets communicated between user equipment (101) and an application service (104) in a packet based network (106). This authenticated application identifier is obtained by packet inspection of data packets in a network gateway (103). Furthermore, use information is stored in a database (105) for statistical and/or charging purposes.

13 Claims, 3 Drawing Sheets

(56) References Cited

U.S. PATENT DOCUMENTS

| | | | |
|---|---|---|---|
| 2009/0133103 A1* | 5/2009 | Sathyan et al. | 726/4 |
| 2010/0037060 A1* | 2/2010 | Irvine | 713/176 |
| 2010/0039993 A1* | 2/2010 | Ramankutty et al. | 370/328 |
| 2010/0054142 A1* | 3/2010 | Moiso et al. | 370/252 |
| 2010/0138775 A1* | 6/2010 | Kohen et al. | 715/781 |
| 2011/0196971 A1* | 8/2011 | Reguraman et al. | 709/228 |
| 2011/0202987 A1* | 8/2011 | Bauer-Hermann et al. | 726/7 |

* cited by examiner

DYNAMIC APPLICATION CHARGING IDENTIFICATION

CROSS REFERENCE TO RELATED APPLICATION(S):

This application is a 35 U.S.C. §371 National Phase Entry Application from PCT/EP2009/067279, filed Dec. 16, 2009, designating the United States, the disclosure of which is incorporated by reference herein in its entirety.

TECHNICAL FIELD

The present invention relates to a solution for handling charging and statistics of use of applications in a wireless communication network and in particular identifying type of service provided in a secure manner.

BACKGROUND

Mobile communications solutions are increasingly becoming more packet based and converge towards Internet based applications and users roam packet based networks. There is also an increasing supply and demand of different types of applications used in these types of networks and there is an interest to make these applications available also to mobile communication platforms such as smart phones, Internet enabled phones, laptops and other mobile computing equipment. However, operators need to control the data traffic in order to provide good Service of Quality (QoS) and balance this with the costs of maintaining and building communication infrastructure. Operators have an interest in providing differentiated charging depending on applications used or type of communication traffic; for instance to differentiate between web surfing using html based information, email traffic, Voice over Internet Protocol (VoIP), gaming, and other applications/protocols.

Current charging solutions, for instance in gateway support nodes, e.g. GGSN, are based on configuration of the packet identification pointing out different charging identifiers. Charging identifiers are, except for the mobile device identifiers, typically Service Identifier (SI) and Rating Group (RG). These charging identifiers are 32 bit in length, even though the some solutions only support 4096 simultaneous identifiers for the SI.

Manual configuration of rules for applications complicates the introduction of new third party services, since a service level agreement (SLA) need to be negotiated between the operator and the application provider and new configuration need to be added to the nodes. To enable fast roll-out of services an automated solution for this is desired.

SUMMARY

It is therefore an object of the present invention to provide solutions that addresses these problems.

The idea of the invention is to, in a secure way, dynamically identify services based on identification of given identities in the packets in a flow.

This may for instance be done based on proprietary additions in the HTTP headers, SMTP headers, IMAP headers or by identification of an application identifier in a URL. This may for instance be done by the introduction of an application identifier parameter which takes any suitable value.

The identifier filtered out from the HTTP headers or URL may then be combined with other identifier(s) given by the matching filtering (packet inspection) rule and then a unique identifier may be constructed within some use database, such as a statistics log, charging log, or charging records. This may then be done without changing the standardized charging format or as vendor specific additions.

The solution according to the present invention use information for statistical purposes, e.g. to be able to do some kind of revenue sharing, but also adds security to the dynamic identification of the services.

Security is obtained by using cryptographic algorithms (authentication) to verify that the application identifier and other parameters are accurate (e.g. defined as a combination of URL and Server IP address together with the application identifier). The authentication code may for instance be calculated in an application registration server and then this authentication code need to be passed along in the payload traffic (e.g. as another HTTP header field) from the client device, e.g. a user equipment (UE), so that it may be verified by a GGSN/PDN-GW/SASN node that performs the charging counting.

This is provided in a number of aspects in which a first is a method for handling applications used in wireless communications network. The method is executed mainly in a gateway node in the wireless communications network and comprises the steps of providing access for a user equipment, i.e. UE, to an application server, i.e. APS, providing download of an authenticated application, e.g. from the APS, to the UE and wherein the application is authenticated using an authentication service, providing communication between a service on a packet data network and the UE using the application, identifying and authenticating the application used in the service using packet inspection of communication packets and determining an application identifier and authentication data located in the packets, determining application statistics relating to the identified application, and storing the application statistics in a database.

The method may for instance further comprise a step of checking authentication of the application using a cryptographic algorithm; for instance by using at least one of an Internet Protocol, i.e. IP, address, application identifier, and port number in the cryptographic algorithm, or by using a uniform resource locator, i.e. URL, in the cryptographic algorithm.

The method may further comprise a step of registering an application in an application registry and/or may further comprise a step of comparing the determined application identifier and stored application identifiers in an application registry related to the authentication service.

The method may further comprise a step of charging a client related to the UE for traffic related to the stored application statistics and may further comprise a step of storing charging data in a charging data record, i.e. CDR.

The gateway node may be one of gateway GPRS support node, i.e. GGSN, Packet Data Network Gateway, i.e. PDN-GW, or service aware support node, i.e. SASN.

The application identifier may be embedded in a protocol header and the protocol may be at least one of:
HTTP—Hypertext transfer protocol
WAP—wireless application protocol
SIP—session management protocol
IMAP—Internet Message Access Protocol
SMTP—simple mail transfer protocol
POP—post office protocol
FTP—File transfer protocol
Telnet
SDP—Session Description Protocol
IRC—Internet Relay Chat
RTP—Real-time transport protocol
RTSP—Real Time Streaming Protocol Another aspect of the present invention is provided, a node in a communications network (100). The node comprises at least one processor, at least one computer readable memory unit, and at least on communications interface. The processor may be arranged to execute computer program instruction sets stored in the computer readable memory unit and using the communications interface for providing access for a user equipment, i.e. UE, to an application server (104), i.e. APS, allowing download of an authenticated application from the APS to the UE, providing communication between a service on a packet data network and the UE using the application, identifying the application used in the service using packet inspection of communication packets and determining an application identifier located in the packets, determining application statistics relating to the identified application, and storing the application statistics in a database.

Furthermore, the present invention may be provided as a system for handling applications used in wireless communications network. The system may comprise a node as exemplified above and a database located separate from the node.

With the solution according to the present invention several advantages may be identified; for instance it is possible to provide statistical information about usage in a packet based network, provide user data to applications, and also to provide secure information which may be used in charging applications in relation to the usage. The solution may be implemented easily into existing products with small amendments and may be distributed as software amendments which provide a cost efficient solution.

BRIEF DESCRIPTION OF THE DRAWINGS

In the following the invention will be described in a non-limiting way and in more detail with reference to exemplary embodiments illustrated in the enclosed drawings, in which.

DETAILED DESCRIPTION OF PREFERRED EMBODIMENTS

Figure 1:
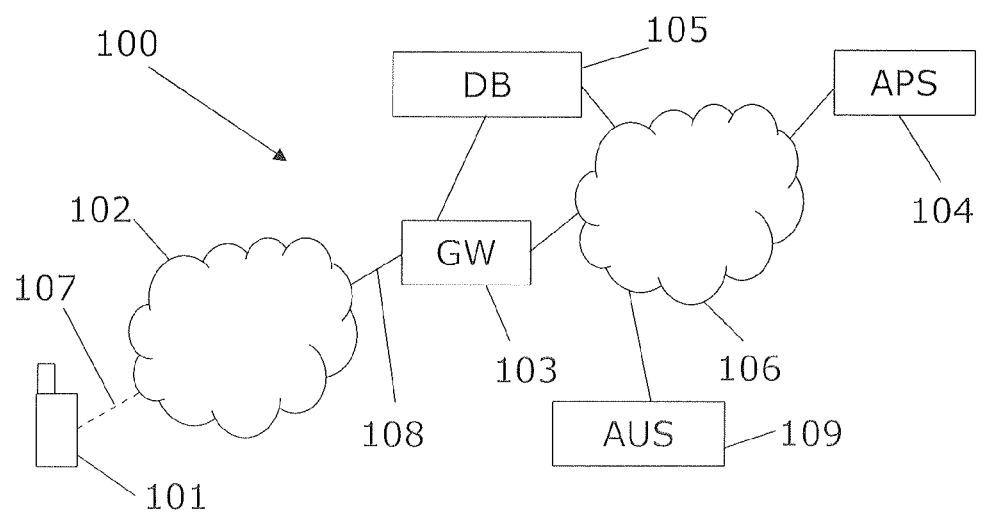
FIG. 1 illustrates schematically in a block diagram a network configuration according to the present invention.

In FIG. 1, reference numeral 100 generally denotes a network according to the present invention. The network comprises core nodes, e.g. a gateway 103, forming part of a core network in communicative connection 108 with an access network 102 and a packet data network 106, e.g. Internet. An application server (APS) 104 may be provided on the packet data network. The core network further comprises a database 105 with communicative connection with the gateway and communicative connection to the packet data network. User equipment (UE) may communicate wirelessly 107 with the access network 102. The network further comprises an authentication service (AUS) 109 used for authentication purposes as will be shown later in this document. Depending on type of network configuration, e.g. LTE/SAE, EUTRAN, UTRAN, or GERAN network, the access network may be differently configured, for instance with eNodeB or RNC/BSC nodes and so on as understood by the skilled person. Furthermore, the network also comprises basic network devices (not shown) such as cabling, routers, switches, and so on forming a physical link between the network nodes.

The present invention handles dynamic application identifiers from payload to create charging records. The solution according to the present invention use dynamic identifier information to dynamically create fully 3GPP standard compliant charging records by providing a secure mechanism to identify services without specifically needing to configure each of them for packet inspection in the core nodes.

The definition of an application identifier may in principle be done in many ways, e.g. the application identifier is defined as a subset of a 3GPP service identifier (SI, 32-bit) that is reserved for this purpose. This application identifier may then be encoded for instance as a string or numeric value for an application protocol header such as for instance an HTTP header field, e.g. named "Application-ID".

Another way to define application identifiers may be to add the application identifier to a HTTP-post message that is visible in the URL as for example "?appl-id=1234".

Protocols that are specially suitable for using the application identifiers in are protocols that have defined ways to be extended; however other protocols may be used as well and below are a list of some common protocols used in relation to Internet communication for which the present solution may be utilized:

HTTP (Hypertext transfer protocol)
WAP (wireless application protocol)
SIP (session management protocol)
IMAP (Internet Message Access Protocol)
SMTP (simple mail transfer protocol)
POP (post office protocol)
FTP (File transfer protocol)
Telnet
SDP (Session Description Protocol)
IRC (Internet Relay Chat) or similar instant text messaging service
RTP (Real-time transport protocol)
RTSP (Real Time Streaming Protocol)

It should be noted that the present invention is not limited to the above mentioned protocols. Furthermore, if an application is used in relation to several protocols, all protocols used will have the application identifier embedded in order to identify the application and be able to keep track of application usage for later billing and/or statistical purposes.

If the application identifier is not possible to be, or not selected to be, directly mapped to a field in a charge data record (CDR) (like for instance SI that is the best fitting parameter according to current charging specifications), mapping tables may be needed, the application identifier as such may be defined as an extension in the CDR, or the application identifier may be used together with other parameters as input to any packet inspection handling.

To verify the security for charging, the identification data of the application is preferably authenticated. This data comprises at least the application identifier and the IP address of the application server; the latter since it is the only known identity used in the network for identification of the service, maybe in conjunction with a port. One complication here is that applications may be in a server farm or load-balanced with DNS over several servers so that several IP addresses may be possible. One way to go around that problem is that the application providers uses an iterative solution for registering and/or authenticating a plurality of IP-addresses in the application registration, e.g. register/authenticate each IP address for each server providing access to the application service at a time. On the other hand service redundancy may require IP-networks to be registered instead. This kind of properties may also be defined together with the authentication code to define the way it should be calculated when authenticating the application. The application is authenticated by registration at an authentication service (AUS) 109 and authentication/identification data are stored in a database 105 accessible by a gateway. This database may also be used for storing usage and/or user information accessible by application providers.

If an operator controlled HTTP-proxy is used, the IP address is not needed to be authenticated, but instead only the URL need to be authenticated.

Several different authentication mechanisms may be supported. If the registration portal or server is under control of the same organization as the gateway, algorithms with pre-shared keys may be supported, i.e. both sides have the same key for encrypting and/or authenticating the application or application session. Otherwise, it is possible to use solutions with public-key algorithms such as asymmetric algorithms based on RSA, Elgamal, or Digital Signature Algorithm (DSS), like for instance as used in e.g. PGP (Pretty Good Privacy), GPG, and Internet Key Exchange.

Figure 2:
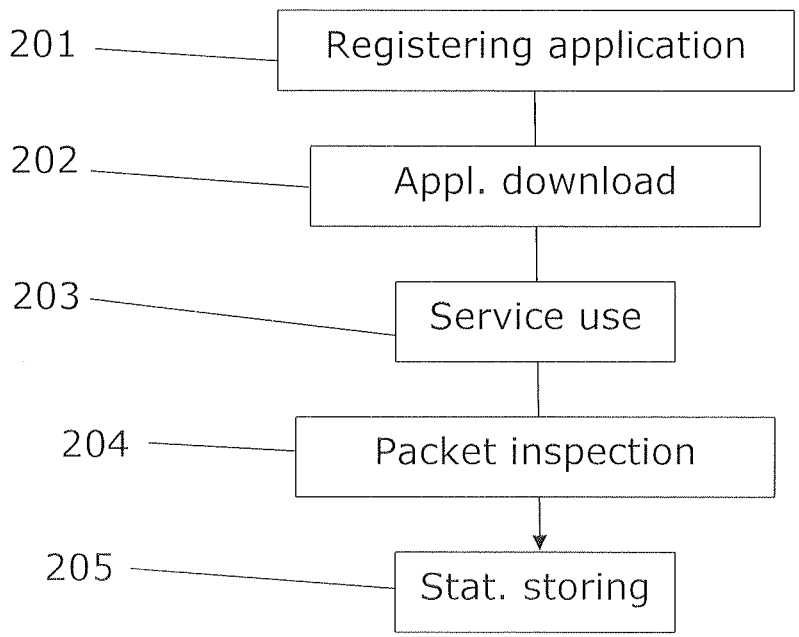
FIG. 2 illustrates schematically a method according to the present invention.
Figure 3:
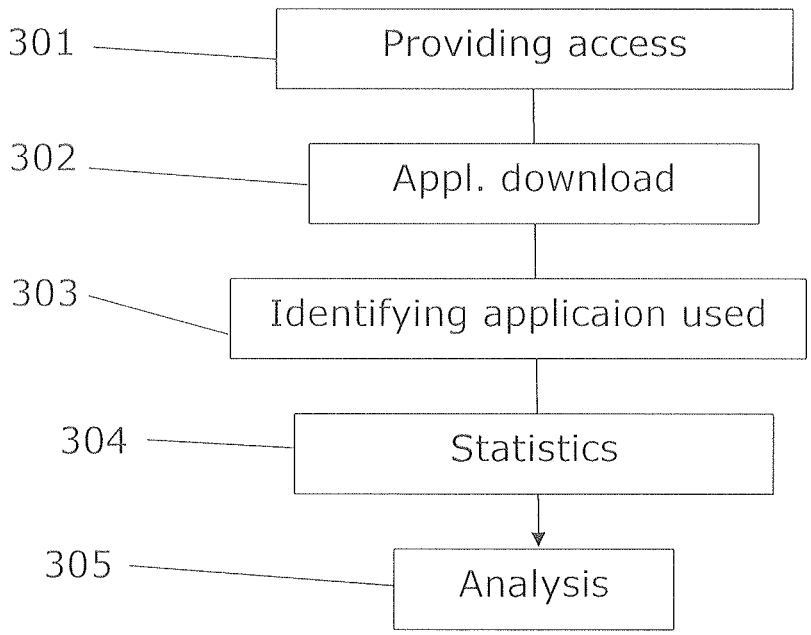
FIG. 3 illustrates schematically a method according to the present invention.

With reference to FIG. 2, the following method steps may be performed as part of the present invention in order to provide useful information to application providers:

201. Application provider develops an application and provides the application at an application server and the application provider registers the application at an application registration portal/server, e.g. at the authentication service (AUS) 109. As a result an application identifier and an authorization code are provided; this may be done in several different ways, e.g. the application may be extended automatically with the information, or the numbers are provided to the application provider that adjusts their application so that it uses the application identifier and authorization code values in the protocols used for communication. This step is usually performed at a setup time and need not be performed each time the application us used or accessed; however, in some circumstances for instance after update of the application it may be advantageous to re-register the application—for instance if the authentication of the application is based on a checksum obtained from the application code or if authentication data is hard-coded into the application.

202. Mobile user downloads the application that has the application identifiers and authentication codes embedded. The APS or some external service may provide access to the application. The application is not required to be downloaded from the APS, it is enough that the application vendor has registered and downloaded the authentication code for the application. Then the application may be downloaded directly from a file server holding the application, or even assigned by the open Internet community. The important thing is that the authentication code is covering the application identifier and other fields in the packet that are needed to properly charge/account/count statistics or whatever that is needed in the SLA between the operator and the Internet service provider.

203. Mobile user uses the service provided by the application through a gateway, e.g. a Gateway GPRS support node (GGSN), service-aware support node (SASN), or packet data network GW (PDN-GW), provided by the operator of the communication network. The invention is not limited to the above mentioned gateways; other GWs for other accesses may also be supported.

204. The gateway inspects the traffic trough packet inspection, such as deep packet inspection procedures, and identifies that a specific application identifier is used and the gateway may determine the authenticity of the application identifier, for instance through checksum control, at the database 105, or against the AUS 109; it should be appreciated that different inspection methods may need to be supported for all handled protocols. The gateway, e.g. GGSN, then counts the statistics for this service and stores that in the proper way, e.g. in performance counters, charging data records on disc, or over on-line charging protocols. Furthermore, the solution according to the present invention, may aggregate statistics from several different services into one or several records, for instance if the cost rate is the same, the use for different services may be aggregated at least for charging purposes.

205. The statistics of the use is stored in a database indirectly or directly accessible for application providers and/or the network operator, i.e. under some circumstances information relating to the use of a particular service may be of interest to obtain knowledge about in order to provide further service levels of enhanced or decreased service.

It should be noted that application identifier information may be inserted with a separate application add-on or plug in program.

Figure 4:
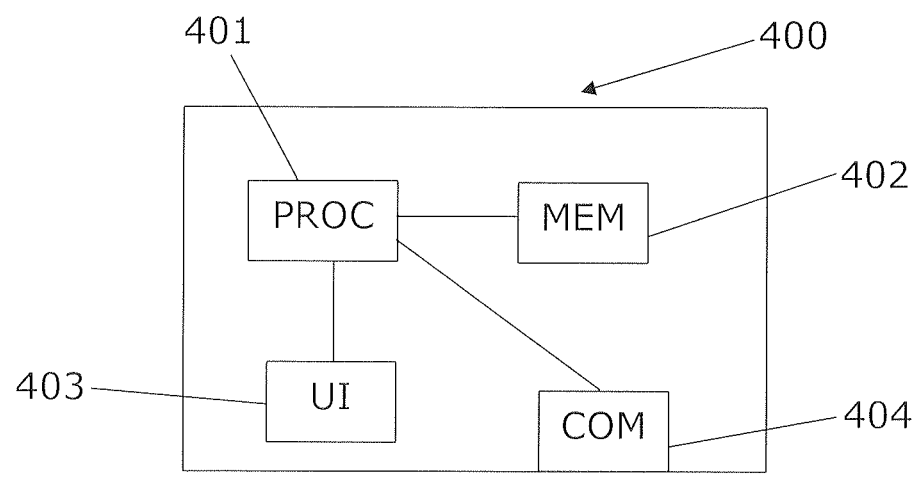
FIG. 4 illustrates schematically in a block diagram a device according to the present invention.

The solution according to the present invention involves a core network node 400, e.g. the GW, as illustrated in FIG. 4, which comprise a processing unit 401, a computer readable storage medium 402, and at least one communication interface 404. Optionally the node 400 also comprises a user interface 403. The processing unit is configured to read instruction sets from the memory and execute these instruction sets of computer program, for handling steps according to the present invention. The processing unit is configured to receive and transmit communication information on the communication interface in turn connected to other nodes in the infrastructure network, arranged to perform packet inspection of data packets, and analyze information obtained from the packet inspection in order to obtain information about applications used, authentication, information, user data or similar information related to statistics of use of application. The invention also involves a database node which comprises similar units, i.e. at least one processor, memory, and communication interface. The database information is transmitted to the database as a communication signal on a network, e.g. packet based network, such as Ethernet. The infrastructure network further comprises other network nodes as high level nodes, such as serving support nodes, charging nodes, or other supporting nodes. Furthermore, it should be understood that the network also comprise low level infrastructure nodes such as routers, switches, cabling and other physical link nodes. The database node and the gateway may be incorporated into one node.

It should be noted that with computer program is meant any type of instruction sets that may be executed by a processor. It may be software instruction sets or hardware instruction sets depending on type of processing device, e.g. microprocessor, central processing unit (CPU), digital signal processor (DSP), a field programmable gate array (FPGA), application specific integrated circuit (ASIC), or similar device.

With computer readable storage medium is meant any type of storage medium accessible by a processing unit, and the storage medium may be of volatile and/or non-volatile type.

It should be noted that the word "comprising" does not exclude the presence of other elements or steps than those listed and the words "a" or "an" preceding an element do not exclude the presence of a plurality of such elements. It should further be noted that any reference signs do not limit the scope of the claims, that the invention may be at least in part implemented by means of both hardware and software, and that several "means" or "units" may be represented by the same item of hardware.

The above mentioned and described embodiments are only given as examples and should not be limiting to the present invention. Other solutions, uses, objectives, and functions within the scope of the invention as claimed in the below described patent claims should be apparent for the person skilled in the art.

Abbreviations
BSC Base station controller
EUTRAN Evolved Utran
GERAN GSM EDGE Radio Access Network
GGSN Gateway GPRS support node
GW Gateway
IP Internet Protocol
LTE Long term evolution
PDN-GW packet data network OW
RNC Radio network controller
SAE System Architecture Evolution
SASN service-aware support node
SLA Service Level agreement
UTRAN UMTS Terrestrial Radio Access Network

The invention claimed is:

1. A method for handling, in a gateway node in a wireless communications network, applications used in a wireless communications network, comprising:
   providing access for a user equipment (UE) to an application server (APS);
   providing download of an authenticated application to the UE, wherein the application is authenticated using an authentication service;
   providing communication of communication packets between a service on a packet data network and the UE using the application, wherein at least one of the communication packets includes an internet protocol (IP) address, a port number, an application identifier and authentication data;
   identifying and authenticating the application used in the service by using packet inspection of the communication packets and determining the application identifier and the authentication data located in the at least one packet;
   determining application statistics relating to the identified application; and
   storing the application statistics in a database.

2. The method according to claim 1, further comprising providing authentication of the application using a cryptographic algorithm.

3. The method according to claim 2, further comprising using at least one of the IP address, the application identifier, and the port number in the cryptographic algorithm.

4. The method according to claim 2, further comprising using a uniform resource locator (URL) in the cryptographic algorithm.

5. The method according to claim 1, further comprising registering the application in an application registry related to the authentication service.

6. The method according to claim 1, further comprising comparing the determined application identifier and stored application identifiers in an application registry related to the authentication service.

7. The method according to claim 1, further comprising charging a client related to the UE for traffic related to the stored application statistics.

8. The method according to claim 7, further comprising storing charging data in a charging data record (CDR).

9. The method according to claim 1, wherein the gateway node is one of a gateway GPRS support node (GGSN), a Packet Data Network Gateway (PDN-GW), or a service aware support node (SASN).

10. The method according to claim 1, wherein the application identifier is embedded in a protocol header of the at least one communication packet.

11. The method according to claim 10, wherein the protocol is at least one of:
   HTTP —Hypertext transfer protocol;
   WAP —wireless application protocol;
   SIP —session management protocol;
   IMAP —Internet Message Access Protocol;
   SMTP —simple mail transfer protocol;
   POP —post office protocol;
   FTP —File transfer protocol;
   Telnet;
   SDP —Session Description Protocol;
   IRC —Internet Relay Chat;
   RTP —Real-time transport protocol; and
   RTSP —Real Time Streaming Protocol.

12. A node in a communications network, comprising:
   a processor;
   a computer readable memory unit; and
   a communications interface;
   wherein the processor is configured to execute computer program instruction sets stored in the computer readable memory unit and use the communications interface for:
      i. providing access for a user equipment (UE) to an application server (APS);
      ii. providing download of an authenticated application to the UE, wherein the application is authenticated using an authentication service;
      iii. providing communication of communication packets between a service on a packet data network and the UE using the application, wherein at least one of the communication packets includes an internet protocol (IP) address a port number, an application identifier. and authentication data;
      iv. identifying and authenticating the application used in the service by using packet inspection of the communication packets and determining the application identifier and the authentication data located in the at least one packet;
      v. determining application statistics relating to the identified application; and vi. storing the application statistics in a database.

13. A system for handling applications used in a wireless communications network, comprising a node according to claim 12 and a database comprising application identities and application authentication data and wherein the database is located separate from the node.

* * * * *

UNITED STATES PATENT AND TRADEMARK OFFICE
CERTIFICATE OF CORRECTION

Page 1 of 1

PATENT NO. : 8,839,365 B2
APPLICATION NO. : 13/516852
DATED : September 16, 2014
INVENTOR(S) : Backman et al.

It is certified that error appears in the above-identified patent and that said Letters Patent is hereby corrected as shown below:

In the specification

In Column 5, Line 18, delete "(DSS)," and insert -- (DSA), --, therefor.

In Column 7, Line 15, delete "OW" and insert -- GW --, therefor.

In the claims

In Column 7, Line 34, in Claim 1, delete "identifier and" and insert -- identifier, and --, therefor.

In Column 8, Lines 44-45, in Claim 12, delete "address a port number, an application identifier. and" and insert -- address, a port number, an application identifier, and --, therefor.

Signed and Sealed this
Twenty-fourth Day of November, 2015

Michelle K. Lee
*Director of the United States Patent and Trademark Office*